United States Patent
Paul et al.

(10) Patent No.: US 7,855,806 B2
(45) Date of Patent: Dec. 21, 2010

(54) BANDING PROFILE ESTIMATOR USING MULTIPLE SAMPLING INTERVALS

(75) Inventors: Peter Paul, Webster, NY (US); Sahand Rabbani, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 721 days.

(21) Appl. No.: 11/769,044

(22) Filed: Jun. 27, 2007

(65) Prior Publication Data

US 2009/0002724 A1      Jan. 1, 2009

(51) Int. Cl.
    H04N 1/60      (2006.01)
(52) U.S. Cl. .................. 358/1.9; 358/1.14; 358/3.26; 358/3.27; 358/504; 347/19
(58) Field of Classification Search .............. 347/19; 358/1.9, 3.26–3.27, 504
    See application file for complete search history.

(56) References Cited

U.S. PATENT DOCUMENTS

| | | | | |
|---|---|---|---|---|
| 4,965,599 A | * | 10/1990 | Roddy et al. | 347/240 |
| 5,264,943 A | * | 11/1993 | Curry | 358/296 |
| 5,430,472 A | * | 7/1995 | Curry | 347/232 |
| 5,936,748 A | * | 8/1999 | Yamamoto | 358/504 |
| 6,043,484 A | * | 3/2000 | Park | 250/234 |
| 6,698,858 B1 | * | 3/2004 | Askeland et al. | 347/12 |
| 6,710,795 B2 | * | 3/2004 | Sanger | 347/240 |
| 6,771,298 B2 | * | 8/2004 | Rahnavard et al. | 347/239 |
| 6,862,414 B2 | * | 3/2005 | Sampath et al. | 399/15 |
| 7,054,568 B2 | | 5/2006 | Mizes et al. | |
| 7,058,325 B2 | * | 6/2006 | Hamby et al. | 399/49 |
| 7,120,369 B2 | * | 10/2006 | Hamby et al. | 399/49 |
| 7,280,779 B2 | * | 10/2007 | Fasen | 399/55 |
| 7,283,143 B2 | * | 10/2007 | Mizes et al. | 347/132 |
| 7,382,507 B2 | * | 6/2008 | Wu | 358/523 |
| 2002/0159791 A1 | | 10/2002 | Chen et al. | |
| 2006/0001911 A1 | | 1/2006 | Viassolo et al. | |
| 2007/0052991 A1 | | 3/2007 | Goodman et al. | |
| 2007/0139509 A1 | | 6/2007 | Mizes et al. | |
| 2007/0236747 A1 | | 10/2007 | Paul | |

* cited by examiner

*Primary Examiner*—King Y Poon
*Assistant Examiner*—Richard Zhu
(74) *Attorney, Agent, or Firm*—Fay Sharpe LLP

(57) ABSTRACT

A method of integrating multiple sampling interval image data with timing information from a defect once-around sensor and the machine page sync signals to estimate a banding profile. By augmenting the sampling interval data with the timing data, proper phasing of each frequency over each sampling interval can be maintained. Specifically, when the data over the multiple intervals is taken, the defect source once-around signal and the page sync signals are also recorded. The combination of this information allows the algorithm to extract phase and amplitude information of banding defects from the sampling intervals using a new matched-filter based parameter estimation algorithm. Estimated banding profiles are then generated from the known frequencies, and the estimated amplitude and phase values.

17 Claims, 12 Drawing Sheets

BANDING PROFILE ESTIMATOR USING MULTIPLE SAMPLING INTERVALS

CROSS REFERENCE TO RELATED PATENTS AND APPLICATIONS

The following patent/application, the disclosures being totally incorporated herein by reference is mentioned:

U.S. application Ser. No. 11/399,100, filed Apr. 6, 2006, entitled "SYSTEMS AND METHODS TO MEASURE BANDING PRINT DEFECTS," by Peter Paul.

BACKGROUND

The exemplary embodiment disclosed herein relates to document processing systems. It finds particular application in conjunction with sensing and control of banding and will be described with particular reference thereto. However, it is to be appreciated that the exemplary embodiment is also amenable to other like applications.

By way of background, in a typical printing system, a photoconductive drum or photoreceptor rotates at an angular velocity. As the photoconductive drum rotates, the photoconductive drum is electrostatically charged. A latent image is exposed line by line onto the photoconductive drum using a scanning laser, for example, using a rotating polygon mirror. The latent image is developed by electrostatically adhering toner particles to the photoconductive drum. The developed image is transferred from the photoconductive drum to the output media such as paper. The toner image on the paper is fused to the paper to make the image on the paper permanent. The surface of the photoconductive drum is cleaned to remove any residual toner on the surface of the photoconductive drum.

Typically, the printing device drives the photoconductive drum using a motor drive system or a motor train. The motor drive system has a substantial amount of external loading because it typically drives the auxiliary rollers and transports the paper through a series of gear trains. With the additional external loading, as well as periodic disturbances due to imperfections in the series of gear trains, the motor drive system imparts a varying velocity on the photoconductive drum.

The varying photoconductive drum velocity causes scan line spacing variation in the printed image. The scan line spacing variation is a significant contributor of artifacts in marking process. For example, halftone banding caused by scan line spacing variation is one of the most visible and undesirable artifacts, appearing as light and dark streaks across a printed page perpendicular to the process direction.

Banding is thus defined as a one dimensional image density variation in the process direction. It is often periodic and it can result from errors in the mechanical motion of rotating components within a marking engine. These components may be gears, pinions, and rollers in the charging and development subsystems, photoreceptors and their drive trains, or the ROS polygon. Several methods have been proposed to perform feedback compensation of banding using image based controls techniques. Such methods involve measuring the banding induced density variation using an imaging system such as an offline scanner or an in situ full width array sensor, or a point sensor such as an ETAC. Based on the density variation, a controller calculates a periodic compensation signal that is injected into the system, either into the imager (ROS), into a power supply to effect a bias, or into the image itself. These methods require an accurate profile of the density variation. Since the density variation is periodic, it can be characterized by the frequency, amplitude, and phase of its fundamental, as well as its harmonics. The frequency of the banding defect can be measured using Fourier analysis, but is typically known ahead of time based on the mechanical design of the marking system.

Of the three banding characteristics, frequency, amplitude, and phase, banding phase is probably the most difficult characteristic to measure. However, for feedback compensation, it may be the most important characteristic. Banding phase is difficult to measure since, relative to the printed page, it varies from page to page. That is, the banding may have a density peak at the beginning of page one, but may have a density trough at the beginning of page two. Thus, if one measured page one, and determined that the phase was such that a density peak occurs at the beginning of each page, upon applying a corresponding compensation to page two, poor performance would result—the banding may even be enhanced by the control system, rather than suppressed. The problem is that the banding source is not synchronous with the print. Thus, one cannot use the print as a phase reference. Methods to augment image data with timing data from a signal that is synchronous with the banding source were disclosed in U.S. application Ser. No. 11/399,100. In particular, a method to determine phase from a single sampling interval was described. This is appropriate when the banding consists of several periods within the sampling interval. For low frequency banding, or for short sampling intervals (such as interdocument zones), determining phase using a single sampling interval may result in a poor estimation of the banding amplitude and phase, since only a few periods of the banding occur in the sampling interval. Further, when using only a single sampling interval, banding sources that are closely spaced in frequency will be difficult to resolve.

Thus, there is a need for a method and system that overcomes the aforementioned problems and others by estimating banding amplitude and phase when each sampling interval contains few periods and when the banding consists of sources that are closely spaced in frequency. The main improvement would be in describing how to incorporate data from multiple sampling intervals through a specific analytic formulation. In addition, the multiple sampling intervals do not need to be uniformly spaced in time. For example, the master scheduler on a printer may allocate interdocument zones 1, 5, 6 for banding measurement on belt revolution 1, while it may allocate only interdocument zone 3 on belt revolution 2. The algorithm may incorporate this data and produce accurate amplitude and phase values for the banding.

REFERENCES

U.S. Publication No. 2002/0159791, published Oct. 31, 2002, entitled SYSTEMS AND METHODS FOR REDUCING BANDING ARTIFACT IN ELECTROPHOTOGRAPHIC DEVICES USING DRUM VELOCITY CONTROL, by Chen, discusses an electrophotographic device which uses a closed loop controller that receives a feedback signal from an encoder connected to the OPC drum to improve the rotational velocity control of the drum. However, the reference does not discuss measuring the image and using this information to improve or alleviate banding defect of the marking device.

BRIEF DESCRIPTION

The exemplary embodiment integrates multiple sampling interval image data with timing information from a defect once-around sensor and the machine page sync signals to estimate a banding profile. By augmenting the sampling interval data with the timing data, proper phasing of each frequency over each sampling interval can be maintained. Specifically, when the data over the multiple intervals is taken, the defect source once-around signal and the page sync signals are also recorded. The combination of this information allows the algorithm to extract phase and amplitude information of banding defects from the sampling intervals using a new matched-filter based parameter estimation algorithm. Estimated banding profiles are then generated from the known frequencies, and the estimated amplitude and phase values.

In accordance with an aspect of the exemplary embodiment, a method of estimating a banding defect profile is provided. The method includes printing and imaging test targets over multiple sampling intervals, obtaining timing information that will place each test target relative to a banding source having a banding defect period, obtaining print profiles, and combining the timing information with the print profiles to obtain an estimate of the banding defect.

In accordance with another aspect of the exemplary embodiment, a method of measuring banding print defects over an optimal number of pages is provided. The method includes printing and imaging test targets over multiple sampling intervals, obtaining limited timing information for the test targets while the test targets are being printed, obtaining print profiles, and combining the limited timing information with timing estimates and with the print profiles to obtain an estimate of a banding defect.

In accordance with an aspect of the exemplary embodiment, a system for estimating a banding defect profile is provided. The system includes a timing module, a digital signal processing (DSP) module, an image sensor, a printer, one or more defect once-around sensors, and a banding correction subsystem.

In order to measure banding print defects over an optimal number of pages, the DSP module may further include a fast Fourier Transform calculator, an optimal page number calculator, and a profile calculator.

BRIEF DESCRIPTION OF THE DRAWINGS

FIG. 5 is a graph showing a low-frequency banding source zoomed in;

FIG. 6 is a graph showing a high-frequency banding source zoomed in;

DETAILED DESCRIPTION

Figure 1:
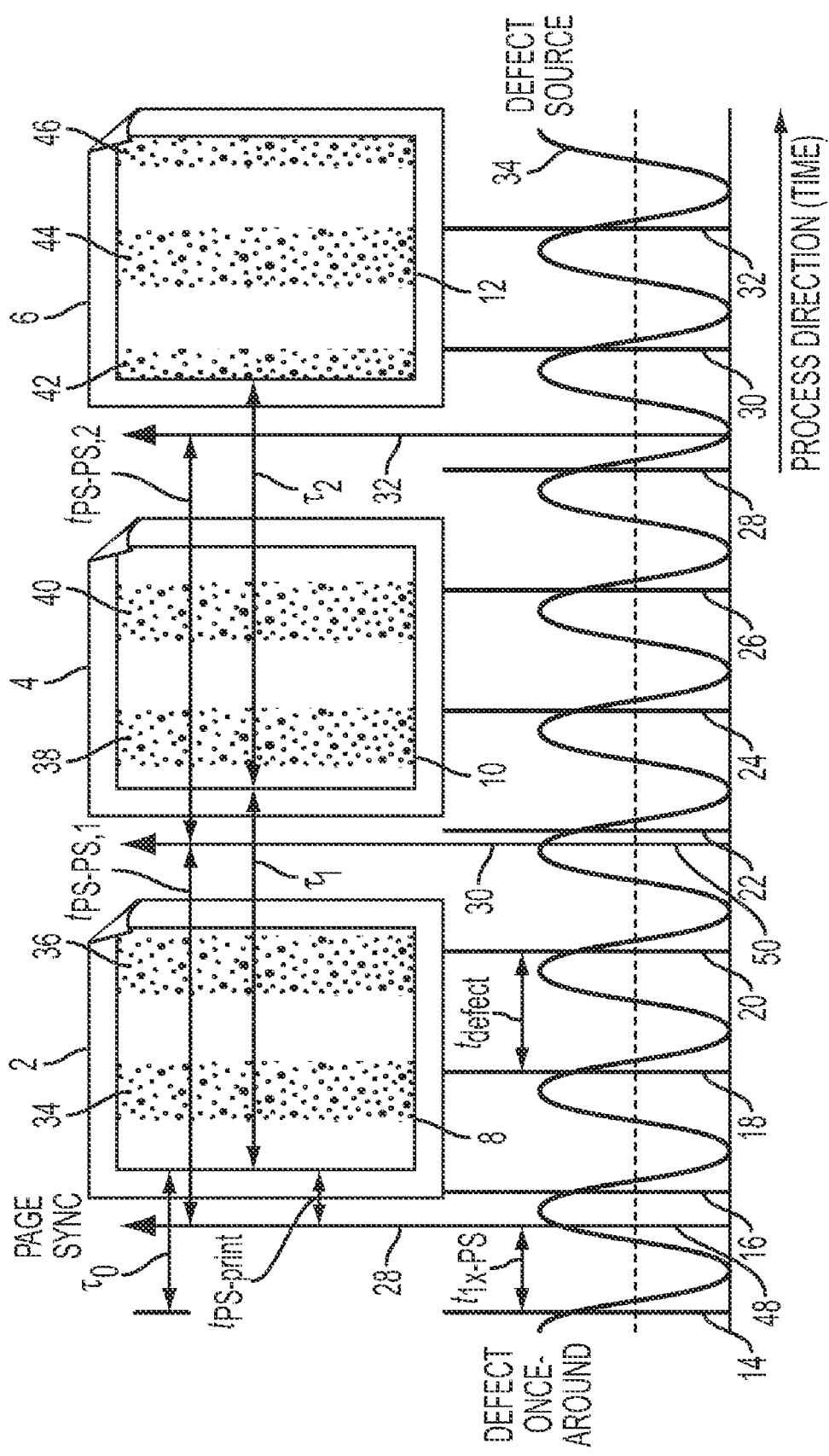
FIG. 1 illustrates banding print defects over time.

Referring now to the drawings wherein the showings are for purposes of illustrating the exemplary embodiments only and not for purposes of limiting the claimed subject matter, a series of images processed by a printing system (see FIG. 3) in a process direction (i.e., the direction of the paper travel in the printing system) is shown in FIG. 1. Consider a print job of M pages, the first three of which are shown in FIG. 1. The boxes with the folded upper right hand corners depict pieces of paper 2, 4, and 6 with printed images or test targets 8, 10, and 12, respectively. They could represent any known sampling interval, such as interdocument zones, customer image zones, image zones outside of the customer image zone, or printed pages. The multiple sampling intervals may be located on an intermediate belt, an intermediate drum, a photoreceptor belt, a photoreceptor drum and/or output media.

The images 8, 10, and 12 on the pieces of paper 2, 4, and 6 represent test targets designed for defect estimation. In the absence of banding defects, the printed test image should be a uniform midtone (i.e., approximately 50% area coverage). Because of banding from mechanical components within the printer, however, the printed test targets 8, 10, and 12 are not uniform in density, but have a periodic density variation in the process direction. Note that the frequency and amplitude of the banding is roughly the same for each test print, but the banding phase relative to the first imaged line is different on every page. In order to efficiently estimate the defect profile, timing information that will place every imaged page relative to the banding source, which is independent of the start of the page, will have to be obtained.

The banding source (or defect) once-around is represented by a series of vertical lines 14, 16, 18, 20, 22, 24, 26, 28, 30 and 32. This signal may be obtained by placing a low cost once-around sensor on the defect source in the printer. This once-around signal corresponds to the periodic thick, dark lines 34, 36, 38, 40, 42, 44, and 46 in the images 8, 10 and 12. The page sync signal, available on any printer, is marked by a series of impulses 48, 50 and 52. The banding defect is represented by a waveform 54, whose one-period profile is to be estimated.

Figure 2:
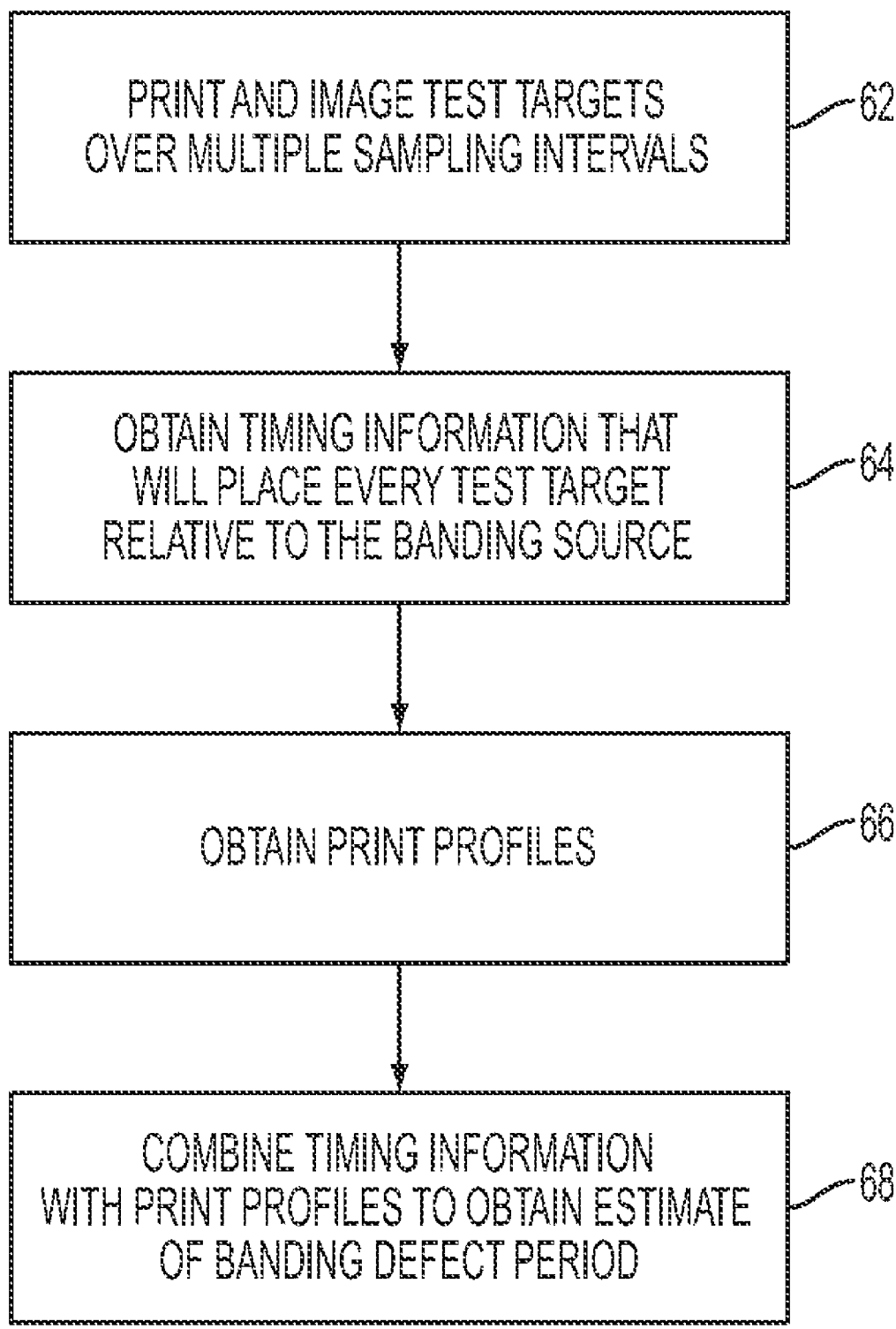
FIG. 2 is a flow chart of a method of estimating a banding profile.

A method of estimating the banding defect profile is shown in FIG. 2. The method includes printing and imaging test targets over multiple sampling intervals (62), obtaining timing information that will place every test target relative to the banding source (64), obtaining print profiles (66), and combining the timing information with the print profiles to obtain an estimate of the banding defect period (68). These steps will be explained in greater detail below.

With continued reference to FIG. 1, important time quantities in the analysis include: $t_{1x\text{-}PS}$, the time from the defect once-around signal to the page sync, $t_{PS\text{-}print}$, the time from the page sync to the start of the imaged page, $t_{PS\text{-}PS,m}$, the time from the page sync impulse m−1 to the impulse m, $t_{defect}$, the defect period, $T_0$, the time from the defect once-around to the start of the first imaged page, and $T_m$, the time from the start of page m−1 to the start of page m.

The desired quantities that will place the imaged pages relative to the defect once-around are indexed by m for m={0, 1, . . . , M−1}. The quantity $t_{1x\text{-}PS}$ will be distinct for every print job, and must be measured by a timer every time this system is executed. The quantity $t_{PS\text{-}print}$ is stable for a given printer (to the tens of nanosecond timescale, since the page sync signals drive the imaging system) and can be measured once and hardwired into the system. Further, the page-sync-to-page-sync delay $t_{PS-PS,m}$ is measured directly for every print—it varies from print to print so it is indexed by m. The banding period $t_{defect}$ is known, since the banding sources can be enumerated and their periods are documented. Other parameters that will help in the analysis include y, the scan resolution in pixels per distance, $v_p$, the process speed in distance per time, $f_s$, the sampling frequency, and N, the number of pixels in the imaged print along the process direction.

Note that the sampling frequency can be determined from the first two quantities:

$$f_s = y \times v_p \quad (1)$$

The value of $T_0$ can be obtained easily from known or measured quantities:

$$\tau_0 = t_{1x-PS} + t_{PS-print} \quad (2)$$

The values of the remaining $T_m$ will be equal to the page-sync-to-page-sync delay times, which are easily measured by a timer. That is, $$\tau_m = t_{PS-PS,m} \text{ for } m = \{0, 1, \ldots, M-1\} \quad (3)$$

Once all values of $T_m$ have been obtained, the time elapsed from a defect once-around signal to the beginning of any page m can be determined:

$$T_m = \sum_{i=0}^{m} \tau_i \quad (4)$$

Thus, the timing information for calculating the estimate is now available.

Next, the print profiles for the test targets are to be obtained. Thus, the nextstep is to scan and crop each of the M prints to obtain matrices corresponding only to the imaged patch on each print. For each print m, calculate an N-point vector whose $n^{th}$ element is $x_m[n] \in \Re$ and represents the average of the pixel values in the $n^{th}$ column of the image matrix orthogonal to the process direction. Note that this can be obtained by an offline scanner or an in situ full width array. In addition, since only a one dimensional profile is required, a point sensor, such as an ETAC sensor may be used.

Now, combine the timing information with the print profiles to obtain an estimate of the banding defect period. The banding frequency $f = 1/t_{defect}$ is known. Therefore, a matched-filter for the sinusoid at the fundamental banding frequency f can be designed:

$$R(f) = \frac{1}{N} \sum_{m=0}^{M-1} \sum_{n=0}^{N-1} x_m[n] e^{-j2\pi f\left(\frac{n}{f_s} + T_m\right)} \quad (5)$$

where m refers to each sampling interval, M is the total number of sampling intervals, n refers to each sample, N is the total number of samples, $x_m(n)$ is the print profile at sample n, $f_s$ is the sampling rate, f is a banding defect frequency related to a defect once around signal time period, $T_m$ is the sampling interval time delay for sampling interval m, and R(f) is the estimation parameter for banding defect frequency f.

The amplitude and phase estimates of the defect are, respectively, $$\hat{A}(f) = \frac{1}{M} |R(f)| \quad (6)$$

$$\hat{\phi}(f) = \angle R(f) \quad (7)$$

where M is the total number of sampling intervals, R(f) is an estimation parameter for banding defect frequency f, A(f) is a banding defect amplitude estimate, and $\phi$(f) is a banding defect phase estimate.

This analysis is then extended to all of the harmonics of the defect frequency. The defect will have amplitude and phase for sinusoidal components at a spectrum of frequencies kf for $k = \{0, 1, \ldots, P-1\}$, where $P = f_s t_{defect}$ is the defect period in samples. For each k, an estimate of the magnitude and phase of the corresponding sinusoidal component may be obtained by calculating the metric R(kf) and applying Equations 6 and 7. The estimate of the banding defect profile is thus:

$$\hat{x}[n] = \sum_{k=0}^{P-1} \hat{A}(kf) \cos\left(2\pi \frac{n}{f_s} kf + \hat{\phi}(kf)\right), \quad (8)$$

for $n = \{0, 1, \ldots, P-1\}$ where P is the total number of harmonically related frequencies in the banding defect estimate, n refers to each sample in a print profile, $f_s$ is the sampling rate, f is a banding defect frequency related to a defect once around signal time period, A(kf) is a banding defect amplitude estimate, $\phi$(kf) is a banding defect phase estimate, and $x_b(n)$ is the banding defect estimate at sample n.

Standard image processing algorithms may be assumed for scanner calibration and set up, scanned image deskewing, and profile generation. Also, the matched-filter expression in Equation 5 may include a windowing function on the profile as well as across sampling intervals as in a standard Fast Fourier Transform.

Figure 3:
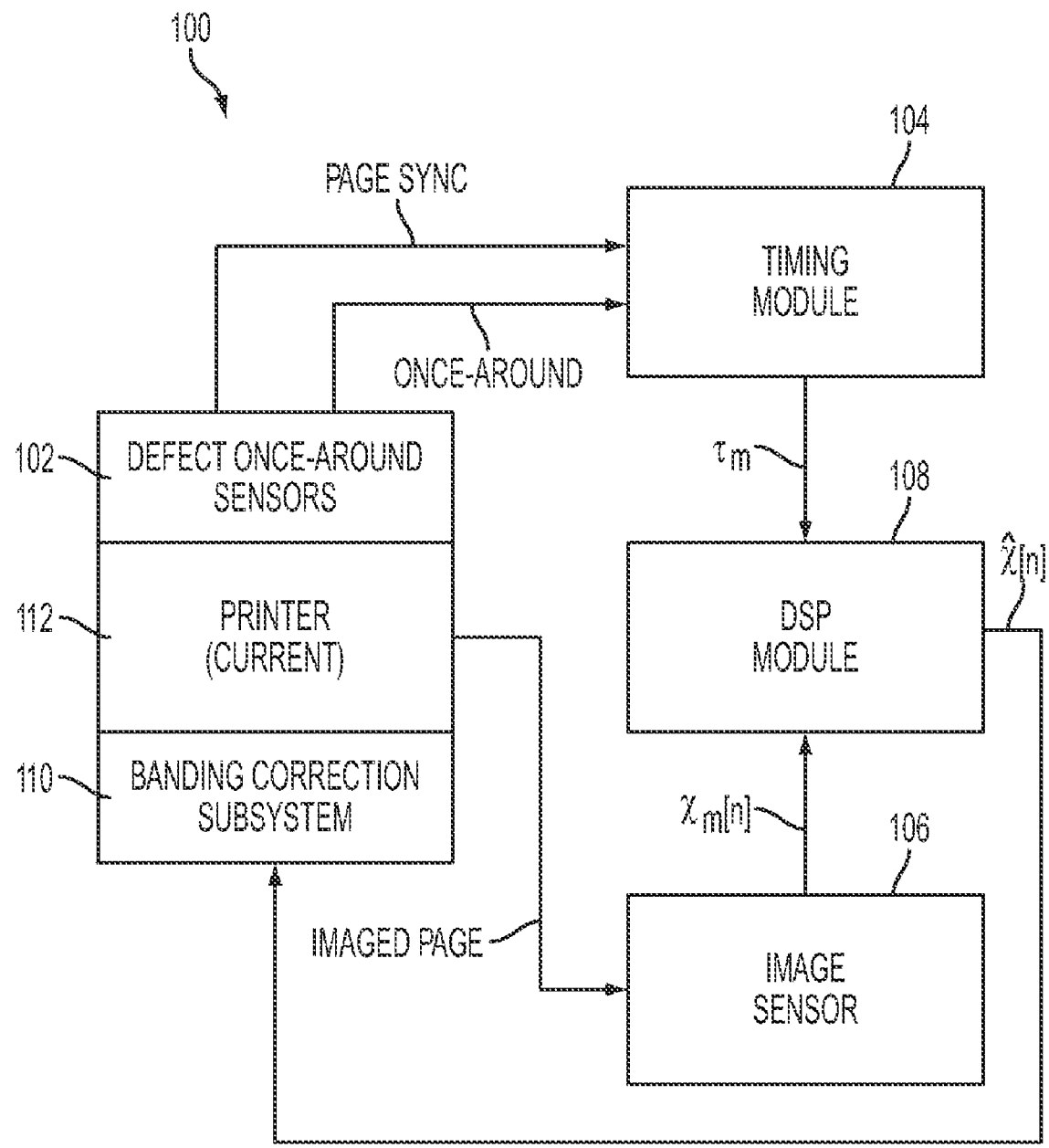
FIG. 3 is a block diagram of a system suitable for implementing the exemplary embodiment.

The implementation of this novel method requires the addition of a few new modules to the printer. FIG. 3 depicts a printing system 100 suitable for implementing the above-described method.

First, the system 100 includes one or more defect once-around sensors 102 for any defect source that is to be corrected. These are discrete sensors that generate pulse when the once-around occurs. Typically they can be obtained for a nominal cost.

The defect once-around sensor(s) 102 send a page sync and a once-around signal to a timing module 104, which calculates $t_{1x-PS}$ and the page-sync-to-page-sync delays $t_{PS-PS,m}$. The timing module 104 could be created from programmable logic chips that would count clock cycles between the page sync and once-around signals. The timing module 104 also has a primitive arithmetic logic unit to obtain the value of $T_0$, in addition to those $T_m$ for $m = \{1, 2, \ldots, M-1\}$, which are directly measured. Since these are simple calculations, very little space on a FPGA would be required.

The system 100 further includes an image sensing module 106. One embodiment calls for an offline scanner manned by a printer technician or customer who would be asked to calibrate the printer periodically to update banding estimates. Another, more automated, embodiment calls for an in-situ sensor or sensing array. This could also be a point density sensor (ETAC) or an external scanner. This scanning module may produce the M N-point print profiles $x_m[n]$.

The outputs of the timing and image sensing (or scanning) modules 104, 106 are forwarded to a DSP (Digital Signal Processing) module 108, which calculates the defect profile estimate using the equations derived above. The DSP module 108 typically consists of a microprocessor and memory needed to calculate the equations of the matched-filter based algorithm.

The defect estimate $\hat{x}[n]$ produced by the DSP module 108 is fed to a banding correction module 110 on a printer 112, which can use the estimated profile to compensate for the banding defect. The printer 112 may comprise one or more of the following: electrophotographic printer, an aqueous ink jet printer, and a solid ink jet printer.

Figure 4:
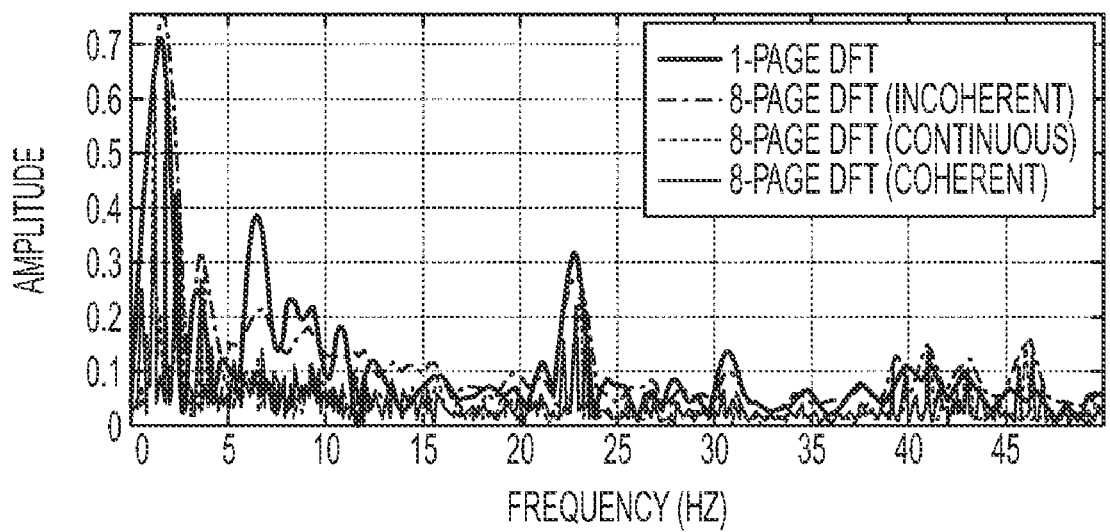
FIG. 4 is a frequency-domain representation of print profiles.

The multiple sampling intervals banding defect estimator has been reduced to practice. By using the method described above, the coherent (in-phase) integration of multiple pages of data allows for significantly better defect estimation, as evidenced by experimentation. FIG. 4 shows four frequency-domain representations of a set of print profiles, including the coherent Discrete Fourier Transform (DFT), which is an extension of the estimation algorithm from Equation 5 to a range of frequencies. The standard one-page DFT is the magnitude of the DFT performed over one page, zero-padded to a length of K to make for finer discrete steps in frequency:

$$X_{DFT}[k] = \frac{1}{N}\left|\sum_{n=0}^{N-1} x_0[n] e^{-j2\pi n \frac{k}{K}}\right|, \text{ for } k = \{0, 1, \ldots, K-1\} \quad (9)$$

where $x_m$ is the N-point print profile of the $m^{th}$ page. This is basically the standard Fast Fourier Transform (FFT) performed over one page. The eight-page incoherent DFT is the pointwise average of the one-page DFT magnitude vectors for eight pages:

$$X_{incoherent}[k] = \frac{1}{NM}\sum_{m=0}^{M-1}\left|\sum_{n=0}^{N-1} x_m[n] e^{-j2\pi n \frac{k}{K}}\right|, \quad (10)$$

for $k = \{0, 1, \ldots, K-1\}$ where M is the number of pages or, in this case, eight. This is a standard method of reducing noise in FFTs—it does not improve frequency resolution and does not allow for the estimation of phase. The coherent DFT is an extension of the familiar quantity from Equation 5:

$$X_{coherent}[k] = \frac{1}{NM}\left|\sum_{m=0}^{M-1}\sum_{n=0}^{N-1} x_m[n] e^{-j2\pi \frac{k}{K}(n+f_s T_m)}\right| \quad (11)$$

for $k = \{0, 1, \ldots, K-1\}$

Note that each frequency (f or k) must separately be properly phase aligned using the method described herein—using the appropriate time delay. One phase alignment does not work for all frequencies, unless one properly considers the time delays. A fourth frequency-domain representation called the continuous DFT, which is a zero-padded DFT of the NM-point vector that is a concatenation of the M N-point print profiles is shown as:

$$X_{continuous}[k] = \frac{1}{NM}\left|\sum_{m=0}^{M-1}\sum_{n=0}^{N-1} x_m[n] e^{-j2\pi \frac{k}{K}(n+mN)}\right|, \quad (12)$$

for $k = \{0, 1, \ldots, K-1\}$

This is the result if one blindly concatenated the data from the multiple sampling intervals, without regard for proper phasing. Of these four DFTs, only the coherent DFT (using the method described herein) considers the timing information in amplitude estimation. This not only improves amplitude estimation, but it improves frequency resolution, and most importantly, it preserves phase. Out of the four methods, it is the only algorithm that can estimate phase using data from all the sampling intervals.

Figure 5:
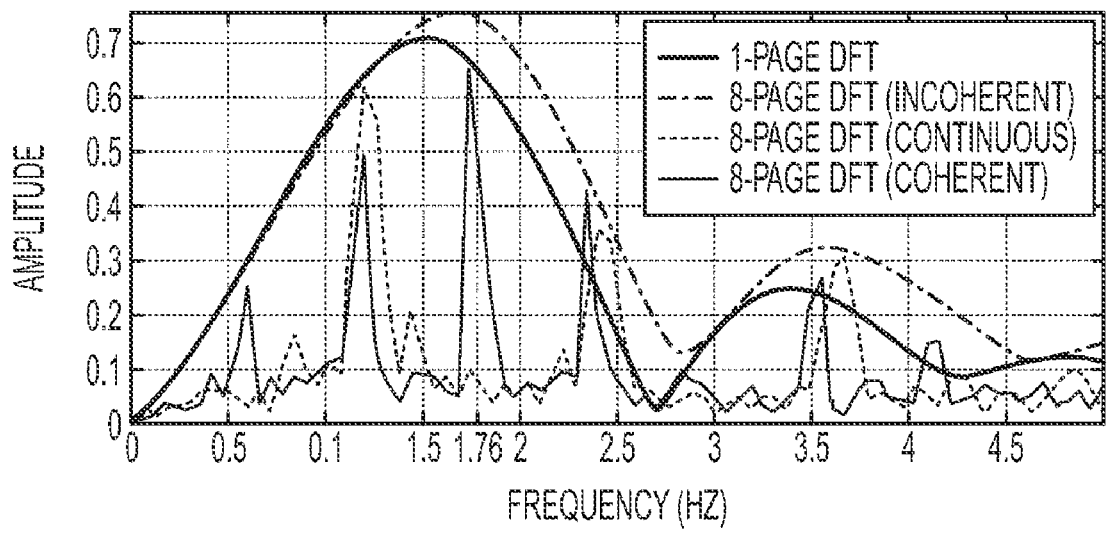

To understand the improved frequency resolution afforded by the coherent estimate, we examine a small frequency range around a low-frequency banding source, such as the photoreceptor at 1.76 Hz in FIG. 5. As expected, the one-page DFT and the incoherent DFT have relatively lower frequency resolution as they are unable to resolve the four distinct frequencies in the print profile between 0 and 2.5 Hz. While the continuous DFT admits higher resolution for using more pages, it still fails to recognize the significant contribution of the photoreceptor frequency because of misaligned phase in the summation. The coherent DFT estimate, however, clearly reveals the banding source at 1.76 Hz, demonstrating the importance of the timing and phase reference information in defect estimation.

Figure 6:
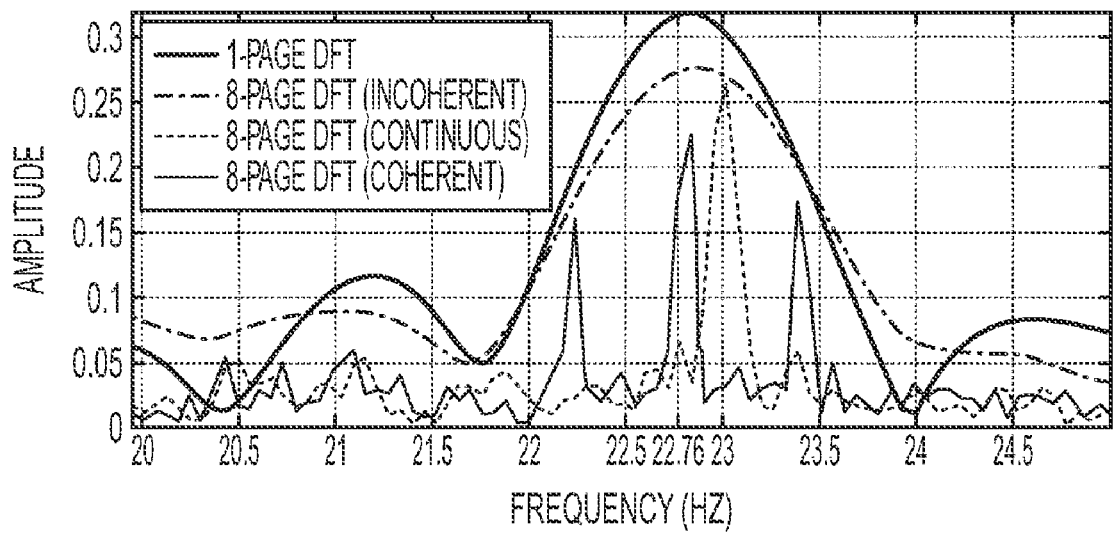

When considering the high-frequency banding sources, such as a worm pinion at 22.76 Hz in FIG. 6, we again observe the superior performance of the coherent DFT. While the one-page DFT and incoherent DFT are unable to resolve frequencies within a few Hz, the continuous DFT misses a few frequencies and overestimates the frequency of the worm pinion. The coherent DFT, however, accurately detects the pinion banding source and a few other banding sources at nearby frequencies.

Figure 7:
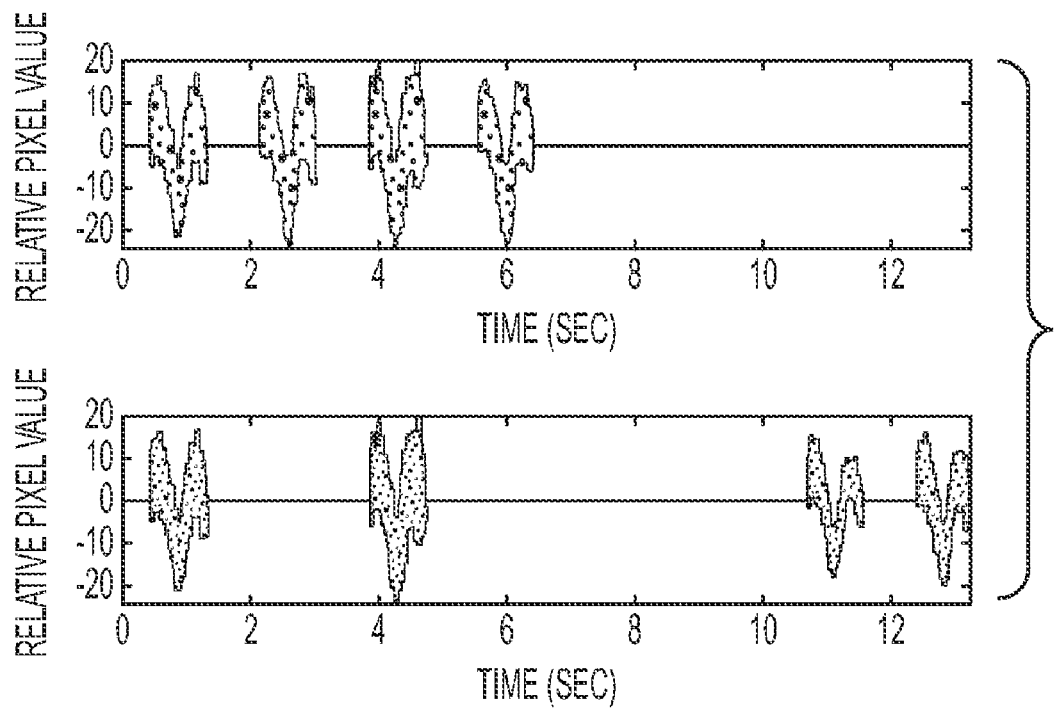
FIG. 7 illustrates interdocument zone placement results.
Figure 8:
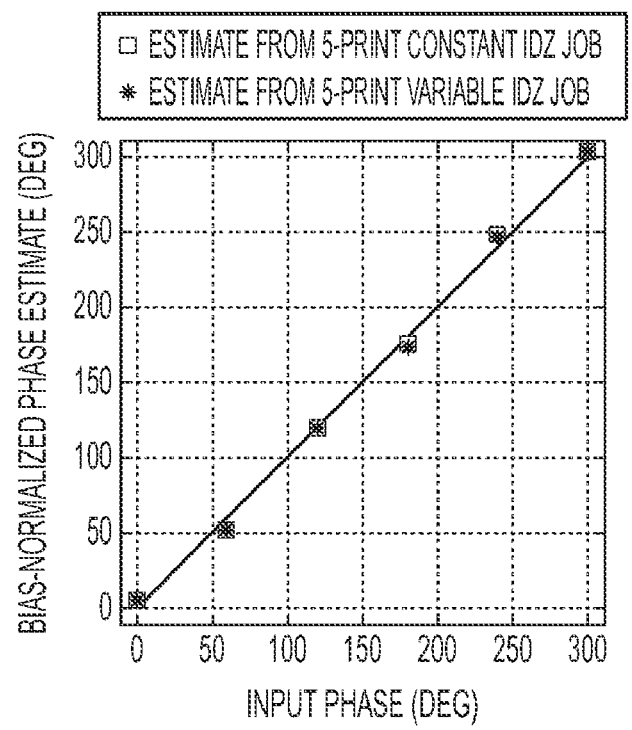
FIG. 8 is a graph showing phase estimation.

Furthermore, it has been verified that the system can estimate phase efficiently. A sinusoidal banding defect with variable starting phase at the photoreceptor frequency was introduced. The defect was induced by modulating the PR shaft with a motor, which is driven by a function generator. In the first experiment, the phase of the defect was estimated from four contiguous pages, separated by constant PS-PS delay times as seen in the first series of FIG. 7. The results of the phase estimation are shown in FIG. 8, with the red data points compared against the one-to-one black line. Then, phase was estimated from four randomly spaced pages as in the second series of FIG. 7. The results of this phase estimation are shown by the blue stars in FIG. 8. These results indicate the robustness of the estimation method with variable interdocument zone times. [Note: Colors will likely be replaced by dotted lines, etc. in the formal drawings, which are currently being prepared.]

Figure 9:
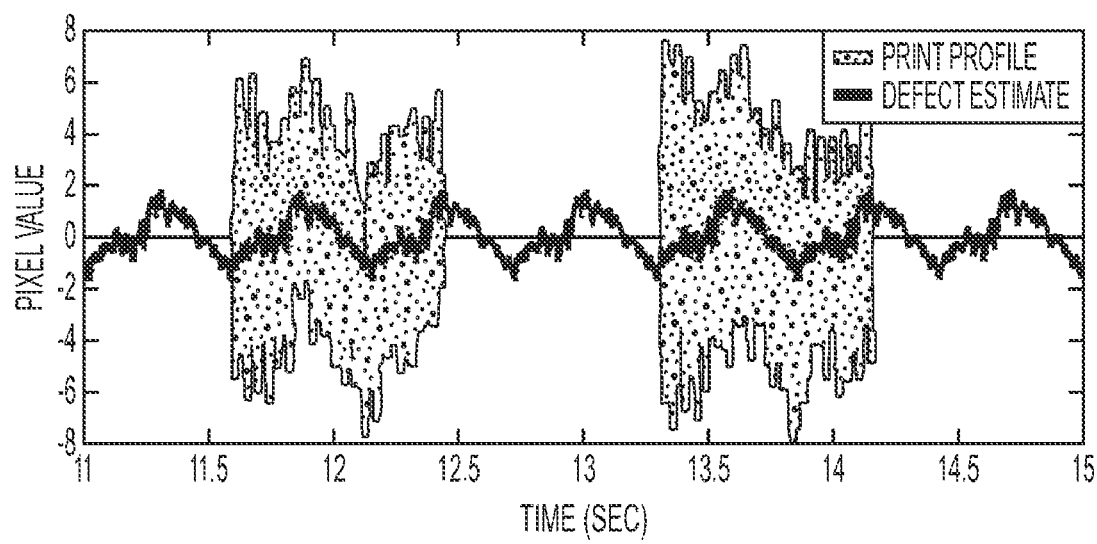
FIG. 9 is a time-domain representation of a print profile and estimate.

A further advantage of the multiple sampling interval parameter estimation algorithm is that it allows one to customize the frequency content of the estimate. It is possible to choose to consider only the first few harmonics of the defect frequency to avoid incorporating high-frequency noise in the estimation. FIG. 9 shows the inherent photoreceptor defect estimate to one hundred harmonics, superimposed over a two-page print profile. The estimate was calculated using sixteen pages. Despite high-frequency noise from other banding sources, the photoreceptor (PR) defect estimate follows the PR banding defect accurately.

Figure 10:
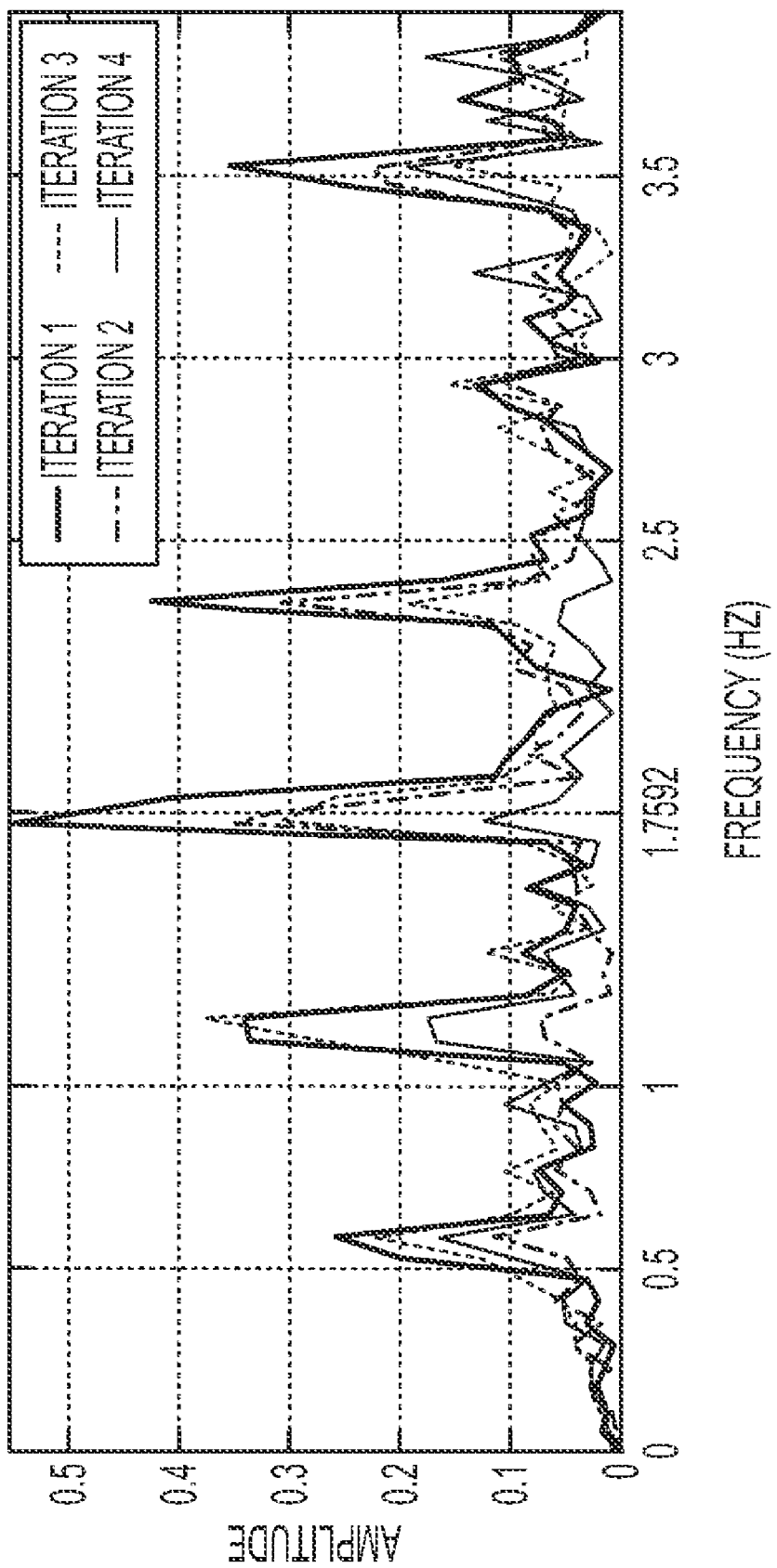
FIG. 10 is a frequency-domain representation of print profiles.

A defect profile, obtained in this way, can be used to compensate for the banding source. Using an iterative process, feedback the defect profile into the exposure system (ROS) using a control technique, obtaining another set of prints. Then, obtain a new defect profile from these prints to feedback to the banding compensation system again. After a few iterations, the amplitude of the inherent photoreceptor defect may be reduced to noise level. FIG. 10 shows the frequency-domain representations of the print profiles over four iterations. This shows that we have clearly locked onto the correct frequency (using prior knowledge), phase (using the banding defect estimation algorithm), and amplitude (using the algorithm plus feedback iterations). Note that feedback iterations are required due to the ROS exposure to scanner reflectance system gain.

It is evident from the experimentation that the multiple sampling interval defect estimation algorithm can be used to estimate accurate banding profiles and then to effectively compensate for banding sources. Aside from reducing banding, this method and system promises a more stable printer, with less reliance on expensive mechanical precision.

Phase Jitter

The banding sources are generally not synchronous with the page and, further, many occur at relatively low frequencies, admitting only a few periods per page. Thus, to efficiently estimate a source's defect profile, multiple imaged pages may be required. Because multiple prints are separated by interdocument zones, data on the defect may incomplete and in such cases may only be coherently integrated with the correct page-to-page timing information, which is generally variable and may be difficult to measure with arbitrarily high accuracy. This variability results in misaligned phase, compromising defect profile estimation. This problem, which is called "phase jitter," may explain the difficulties with coherently combining data from multiple imaged pages.

In an alternative embodiment, estimation of the banding defect may be made through the implementation of a high signal-to-noise ratio statistical signal processing algorithm that intelligently integrates the error-prone timing information from the defect once-around and page sync signals and the data from multiple printed images. Specifically, this embodiment describes a method and system (1) to in situ determine the optimal number of pages (for each frequency) to use for defect profile estimation to exploit the higher frequency resolution offered by multiple pages while minimizing the effect of phase jitter and (2) to estimate the phase and amplitude of defect sources using this optimal number of pages.

Figure 11:
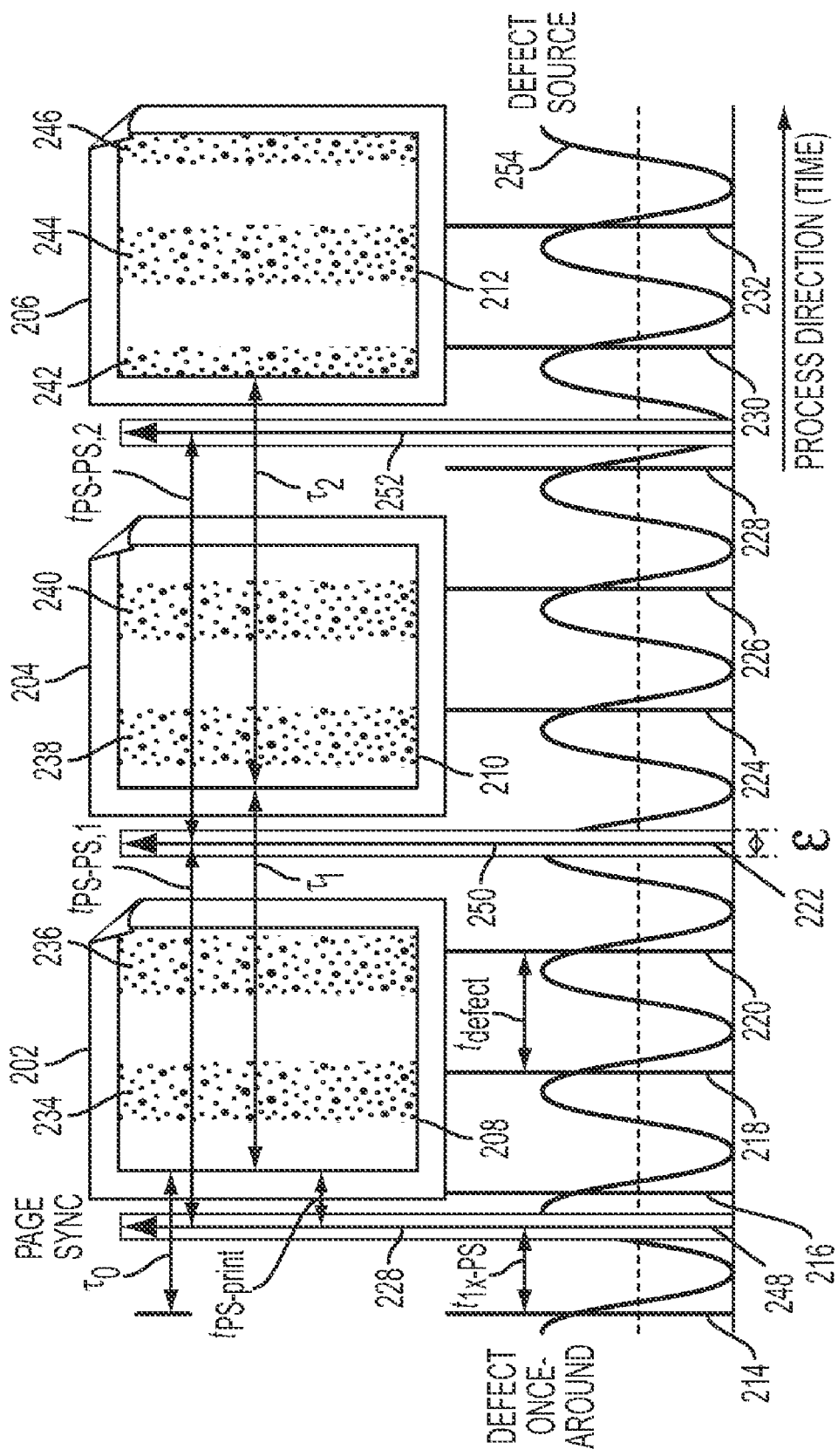
FIG. 11 illustrates banding print defects over time with phase jitter.

A series of images processed in a process direction (i.e., the direction of the paper travel in the printing system) is shown in FIG. 11, which closely resembles FIG. 1. Once again, consider a print job of M pages, the first three of which are shown in FIG. 11. The boxes with the folded upper right hand corners depict pieces of paper 202, 204, and 206 with printed images or test targets 208, 210, and 212, respectively. They could represent any known sampling interval, such as inter-document zones, customer image zones, image zones outside of the customer image zone, or printed pages. The images 208, 210, and 212 on the pieces of paper 202, 204, and 206 represent test targets designed for defect estimation. In the absence of banding defects, the printed test image should be a uniform midtone (i.e., approximately 50% area coverage). Because of banding from mechanical components within the printer, however, the printed test targets 208, 210, and 212 are not uniform in density, but have a periodic density variation in the process direction. Note that the frequency and amplitude of the banding is roughly the same for each test print, but the banding phase relative to the first imaged line is different on every page. In order to efficiently estimate the defect profile, timing information that will place every imaged page relative to the banding source, which is independent of the start of the page, will have to be obtained.

The banding source (or defect) once-around is represented by the vertical lines 214, 216, 218, 220, 222, 224, 226, 228, 230 and 232. This signal may be obtained by placing a low cost once-around sensor on the defect source in the printer. This once-around signal corresponds to the periodic thick, dark lines 234, 236, 238, 240, 242, 244, and 246 in the images 208, 210 and 212. The page sync signal, available on any printer, is marked by a series of impulses 248, 250 and 252. The banding defect is represented by a waveform 254, whose one-period profile is to be estimated.

The timing information includes the time from the first page sync impulse 248 to the second page sync impulse 250, from the second page sync impulse 250 to the third page sync impulse 252, and so on. This measurement, however, is prone to error, which may be illustrated graphically with the gray error bars around the page sync impulses 248, 250 and 252.

Figure 12:
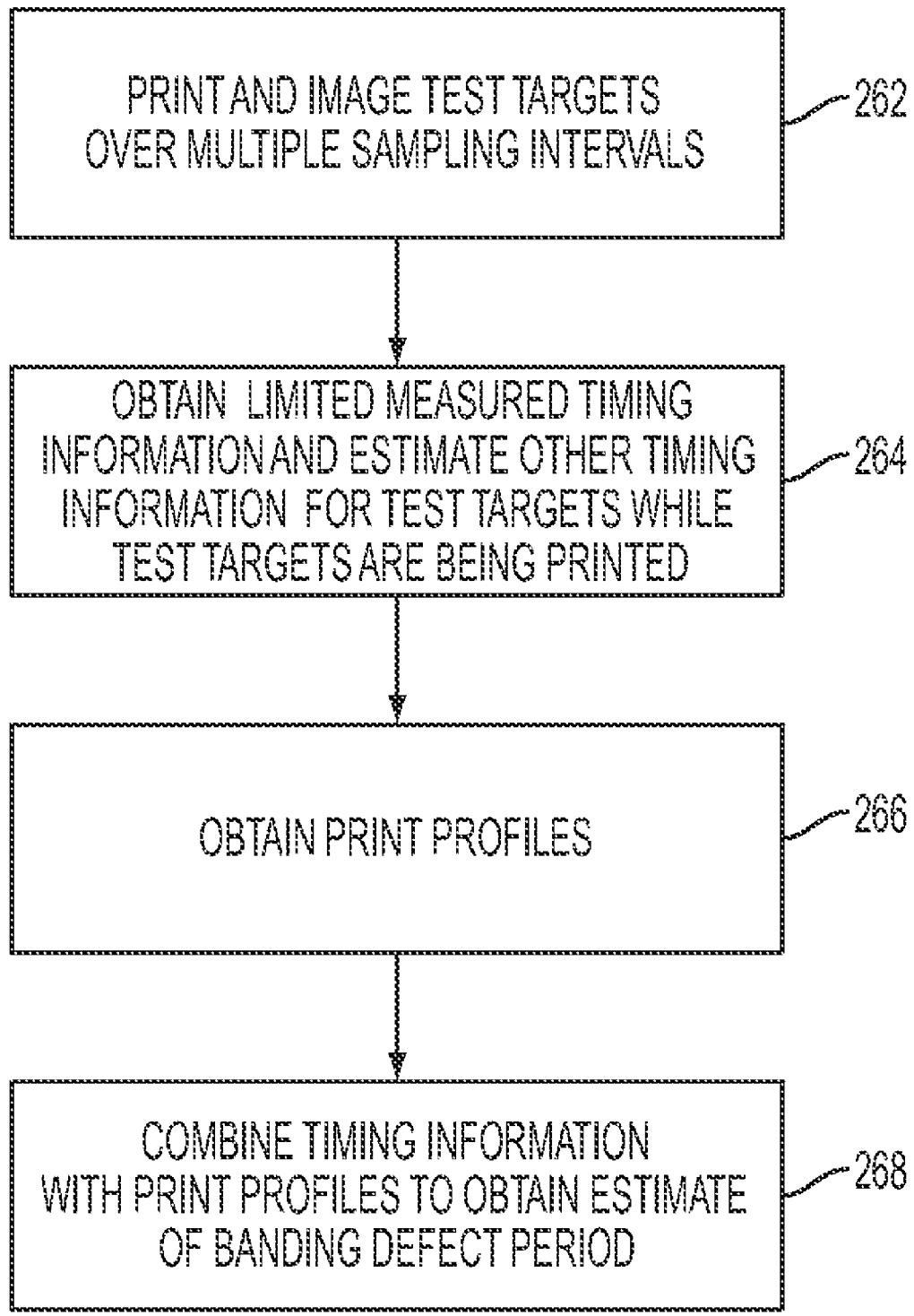
FIG. 12 is a flow chart of an alternative method of estimating a banding profile.

A method of measuring banding print defects over optimal pages is shown in FIG. 12. The method includes printing and imaging test targets over multiple sampling intervals (262), obtaining limited measured timing information and estimating other timing information for test targets while the test targets are being printed (264), obtaining print profiles (266), and combining the timing information with the print profiles to obtain an estimate of the banding defect period (268). These steps will be explained in greater detail below.

Important time quantities in the analysis include $t_{1x\text{-}PS}$, the observed time from the defect once-around signal to the page sync, $t_{PS\text{-}print}$, the time from the page sync to the start of the imaged page, $t_{PS\text{-}PS,m}$, the observed time from page sync impulse m−1 to impulse m, $t_{defect}$, the defect period, $\tau_0$, the true time from the defect once-around to the start of the first imaged page, $\hat{\tau}_0$, the observed time from the defect once-around to the start of the first imaged page, $\tau_m$, the true time from the start of page m−1 to the start of page m, $\hat{\tau}_m$, the observed time from the start of page m−1 to the start of page m, $\epsilon_m$, the error in measurement of $\tau_m$ equal to $\hat{\tau}_m - \tau_m$.

The desired quantities that will place the imaged pages relative to the defect once-around are all m for m={0, 1, ..., M−1}. The quantity $t_{1x\text{-}PS}$ will be distinct for every print job, and must be measured by a timer, which will introduce some error $\epsilon_m$. The quantity $t_{PS\text{-}print}$ is stable for a given printer and can be measured once and hardwired into the system. Further, the page-sync-to-page-sync delay $t_{PS\text{-}PS,m}$ may be somewhat stable when the printer enters a steady-state mode, but is subject to some variability. The banding period $t_{defect}$ is known, since the banding sources can be enumerated and their periods are documented. Other parameters that will help in the analysis include y, the scan resolution in pixels per distance, $v_p$, the process speed in distance per time, $f_s$, the sampling frequency, and N, the number of pixels in the imaged print along the process direction.

Note that the sampling frequency can be determined from the first two quantities:

$$f_s = y \times v_p \quad (13)$$

The value of $\hat{\tau}_0$ can be obtained easily from known or measured quantities:

$$\hat{\tau}_0 = t_{1x\text{-}PS} + t_{PS\text{-}print} \quad (14)$$

The values of the remaining $\hat{\tau}_m$ are equal to the observed page-sync-to-page-sync times, $$\hat{\tau}_m = t_{PS\text{-}PS,m}, \text{ for } n = \{0, 1, \ldots, P-1\} \tag{15}$$

Figure 14:
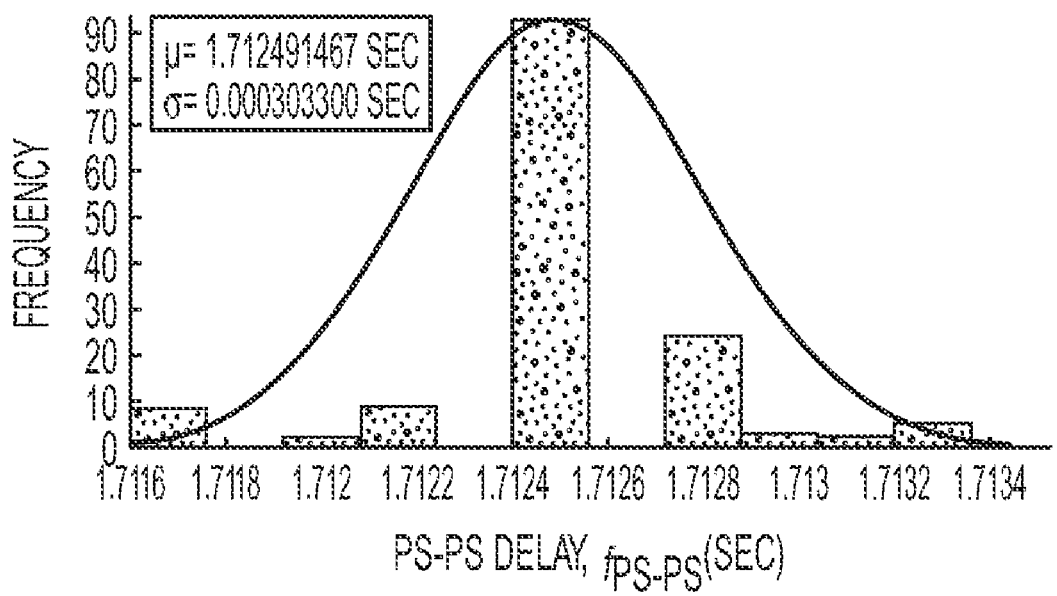
FIG. 14 is a graph of page-sync-to-page-sync times.

When the printer enters a steady-state mode, the page-sync-to-page-sync delay time becomes relatively consistent. In this case, the mean value of the PS-PS time may be assumed as determined from previous experimentation. This value is called $t_{PS\text{-}PS,\mu}$. If it is assumed $t_{PS\text{-}PS,m} = t_{PS\text{-}PS,\mu}$ for $m = \{1, 2, \ldots, M-1\}$, then phase jitter is introduced from the variability in the PS-PS time. FIG. 14 from the description of the prototype below shows that the PS-PS time for the printer approximates a Gaussian random variable with a small variance.

The limited timing information required to be measured during the printing of the test target is the quantity $t_{1x\text{-}PS}$, which is the defect once around to page sync time delay. The timing information that is not directly measured, but is estimated is $t_{PS\text{-}PS,m}$, which is the page sync to page sync time delay. Instead of the measured value, the average value is used, $t_{PS\text{-}PS,\mu}$. This avoids measuring this quantity in real time, which may reduce overall system cost.

Once all values of $\hat{\tau}_m$ have been obtained, the observed time elapsed from a defect once-around signal to the beginning of any page m can be determined:

$$\hat{T}_m = \sum_{i=0}^{m} \hat{\tau}_i \tag{16}$$

If the actual time elapsed from a defect once-around signal to the beginning of the $m^{th}$ page is called $T_m$, then $\hat{T}_m$ is expressed as the sum of a desired term and an error term:

$$\hat{T}_m = \sum_{i=0}^{m} \hat{\tau}_i = \sum_{i=0}^{m} (\tau_i + \varepsilon_i) = \sum_{i=0}^{m} \tau_i + \sum_{i=0}^{m} \varepsilon_i = T_m + \sum_{i=0}^{m} \varepsilon_i \tag{17}$$

As m grows, the error term of $\hat{T}_m$ compounds such that timing estimates for later pages have higher phase jitter. That is, the variance (or phase jitter) of $\hat{T}_m$ increases with m.

Optimal Number of Pages

Next, the print profiles are obtained. Each of the M prints is scanned and cropped to obtain matrices corresponding only to the imaged patch on each print. For each print m, calculate an N-point vector whose $n^{th}$ element is $x_m[n] \in \Re$ and represents the average of the pixel values in the $n^{th}$ column of the image matrix orthogonal to the process direction.

For each print m, combine the noisy time measurement from the banding source once-around with he print profiles $x_m$ to obtain an estimate of the banding defect period for a banding source at known frequency $f = 1/t_{defect}$. A modified fast Fourier transform algorithm tuned to the frequency f and shifted in phase to reference the defect period to the defect source once-around instead of the beginning of the page may be used. Thus, for each page m, obtain a complex number describing the amplitude and phase of the defect frequency for that page:

$$R_m(f) = \frac{e^{-j2\pi f \hat{T}_m}}{N} \sum_{n=0}^{N-1} x_m[n] e^{-j2\pi f n/f_s} \tag{18}$$

The values $R_m(f)$ for $m = \{0, 1, \ldots, M-1\}$ are noisy realizations of the same complex number, with variation arising from phase jitter and noise within the prints. To determine the number of pages that gives the best signal-to-noise ratio, coherently add the values $R_m(f)$ to see which gives the highest amplitude estimate:

$$\max_{m \in \{0,1,\ldots,M-1\}} \frac{1}{m} \left| \sum_{i=0}^{m-1} R_i(f) \right| \tag{19}$$

The value of m that gives the highest amplitude estimate is called $M_{opt}(f)$. If more than $M_{opt}(f)$ prints are used, the increased phase jitter causes sufficient misalignment in the FFT of Equation 18 that the added benefit of the additional page is exceeded by its cost in added phase jitter.

Defect Profile Estimate

Once the optimal number of pages is determined, it is possible to estimate the defect profile. The phase estimate is calculated from the first $M_{opt}(f)$ pages:

$$\hat{\phi}(f) = \angle \left( \sum_{i=0}^{M_{opt}(f)-1} R_i(f) \right) \tag{20}$$

As an initial amplitude estimate, coherently combine the data from the first $M_{opt}(f)$ pages as above:

$$\hat{A}_0(f) = \frac{1}{M_{opt}(f)} \left| \sum_{i=0}^{M_{opt}(f)-1} R_i(f) \right| \tag{21}$$

Next, obtain an estimate of the amplitude from the second set of $M_{opt}(f)$ pages, since the compounded phase jitter from the first set will only harm the phase estimate—and not the amplitude estimate—of the second set:

$$\hat{A}_1(f) = \frac{1}{M_{opt}(f)} \left| \sum_{i=M_{opt}(f)}^{M_{opt}(f)-1} R_i(f) \right| \tag{22}$$

The final amplitude estimate, then, is the incoherent average of all complete sets of $M_{opt}(f)$ pages:

$$\hat{A}(f) = \frac{1}{\lfloor M/M_{opt}(f) \rfloor} \sum_{j=0}^{\lfloor M/M_{opt}(f) \rfloor - 1} \hat{A}_j(f) \tag{23}$$

Finally, extend this analysis to all of the harmonics of the defect frequency. The defect will have amplitude and phase for sinusoidal components at a spectrum of frequencies kf for $k = \{0, 1, \ldots, P-1\}$, where $P = f_s t_{defect}$ is the defect period in samples. For each k, it is thus possible to obtain an estimate of the amplitude and phase of the corresponding sinusoidal component by first calculating the metrics $R_m(kf)$ from Equation 18, determining the optimal number of pages $M_{opt}(kf)$ from Equation 19, and finding $\hat{\phi}(kf)$ and $\hat{A}(kf)$ by Equations 20 and 23. The estimate of the defect period is then, $$\hat{x}[n] = \sum_{k=0}^{P-1} \hat{A}(kf)\cos\left(2\pi \frac{n}{f_s} kf + \hat{\phi}(kf)\right), \quad (24)$$

for $n = \{0, 1, \ldots, P-1\}$

"Pages" (or multiple sampling intervals) could be interdocument zones, customer images zones, image zones outside of the customer image zones, or printed pages. The multiple sampling intervals may be located on an intermediate belt, an intermediate drum, a photoreceptor belt, a photoreceptor drum and/or output media. Image sensors used in the method could include any sensor that can determine a density profile, such as an offline scanner, an in situ full width array, a camera, an external scanner, a point density sensor such as an ETAC, or a color measuring sensor. Standard image processing algorithms are assumed for scanner calibration and set up, scanned image deskewing, and profile generation. The modified fast Fourier transform expression in Equation 18 may include a windowing function on the profile as in a standard FFT.

The implementation of this method of determining an optimal defect profile requires the addition of a few low cost modules to the printer. Once again, FIG. 3 depicts a system suitable for implementing the above embodiment.

Figure 13:
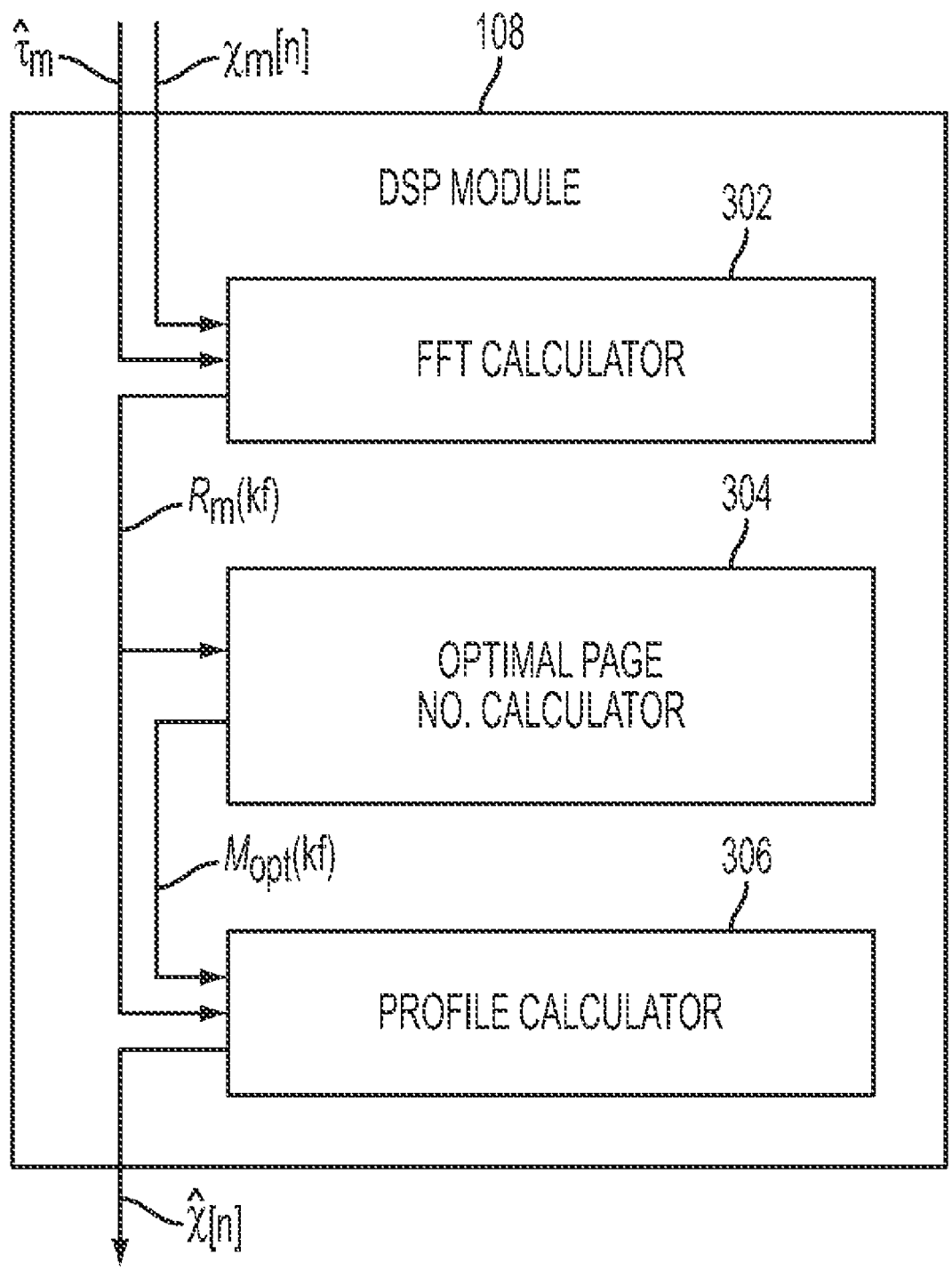
FIG. 13 is a block diagram of the DSP module.

FIG. 13 is a low-level depiction of this module illustrating data flow. In this embodiment, the DSP module 108 includes an FFT calculator 302, an optimal page number calculator 304 and a profile calculator 306. The hardware may consist of a microprocessor with a block memory or, alternatively, a programmable gate array.

The defect estimate $\hat{x}[n]$, which is the final output of this system, can, for example, be fed to a banding correction subsystem of the printer, which would use the estimated profile to compensate for the banding defect.

This embodiment has been reduced to practice. Experimentation reveals that when the machine enters a steady-state printing mode, the pagesync-to-pagesync time becomes relatively consistent, with only a small variance. In the prototype, the mean page-sync-to-page-sync time was assumed to avoid making several time measurements per print job:

$$t_{PS-PS,m} = t_{PS-PS,\mu} \text{ for } m = \{1, 2, \ldots, M-1\} \quad (13)$$

This introduces some phase jitter that can be modeled as a Gaussian random variable $\epsilon_m \sim N(\mu, \sigma^2)$ for $m = \{1, 2, \ldots, M-1\}$. The mean and standard deviation of the error term are estimated from 150 measurements of the page-sync-to-page-sync time, summarized in FIG. 14. Though the variance appears small, simulation reveals that the phase jitter is significant. A model that simulates several pages of print profiles separated by interdocument zones with uncorrelated Gaussian timing error having variance as in FIG. 14 has been developed. The simulated print profiles consist of a sinusoidal defect and additive white Gaussian noise. These profiles were run through the system proposed by this exemplary embodiment, and the resulting defect period estimate was used to correct the defect in the next set of simulated prints by subtracting a periodic extension of this defect profile from the print profiles. This process was repeated in a feedback loop for an arbitrary number of iterations.

Figure 15:
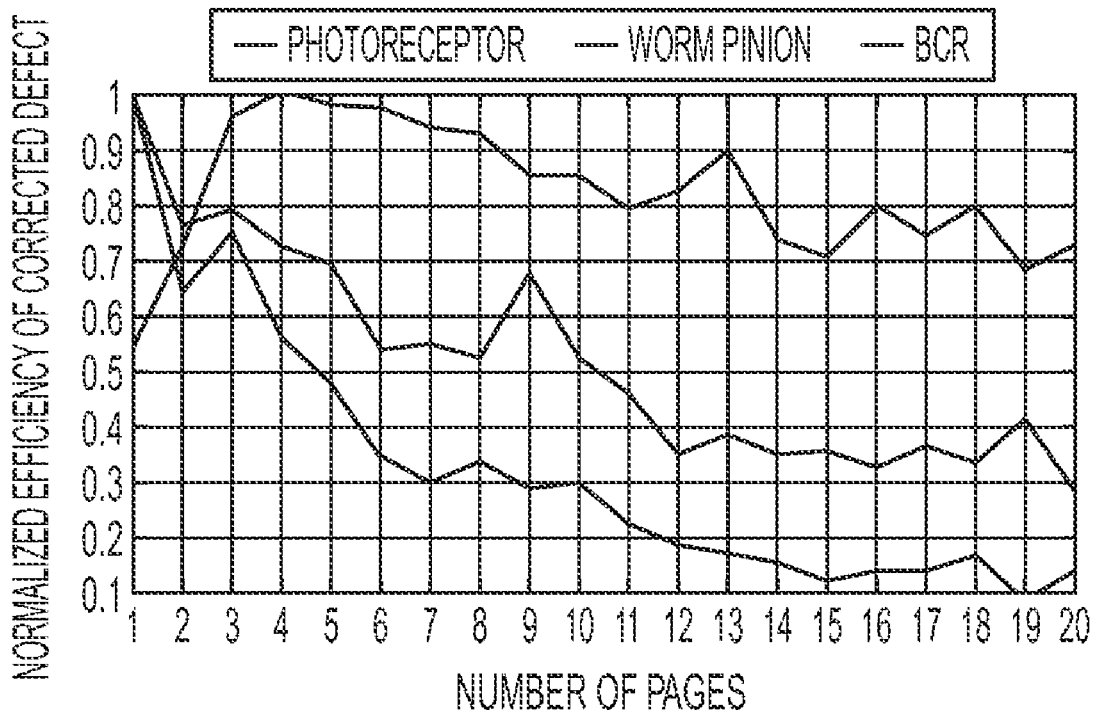
FIG. 15 shows the simulation results for efficiency of banding compensation.

In a Monte Carlo simulation, several trials of the compensation system for banding sources were run at three different frequencies, using a variable number of pages for the banding defect profile estimate. Each trial consisted of three iterations, and the energy of the banding defect was calculated in the final corrected print. FIG. 15 shows the efficiency metric (inverse of the defect energy) for three banding source frequencies as a function of the number of pages used in defect estimation. The results reveal that for a high-frequency worm pinion banding source at 22.76 Hz, one page is optimal for amplitude and phase estimation. The lower-frequency bias charging role at 3.77 Hz also calls for one page, while the low-frequency photoreceptor at 1.76 Hz calls for four pages.

Figure 16:
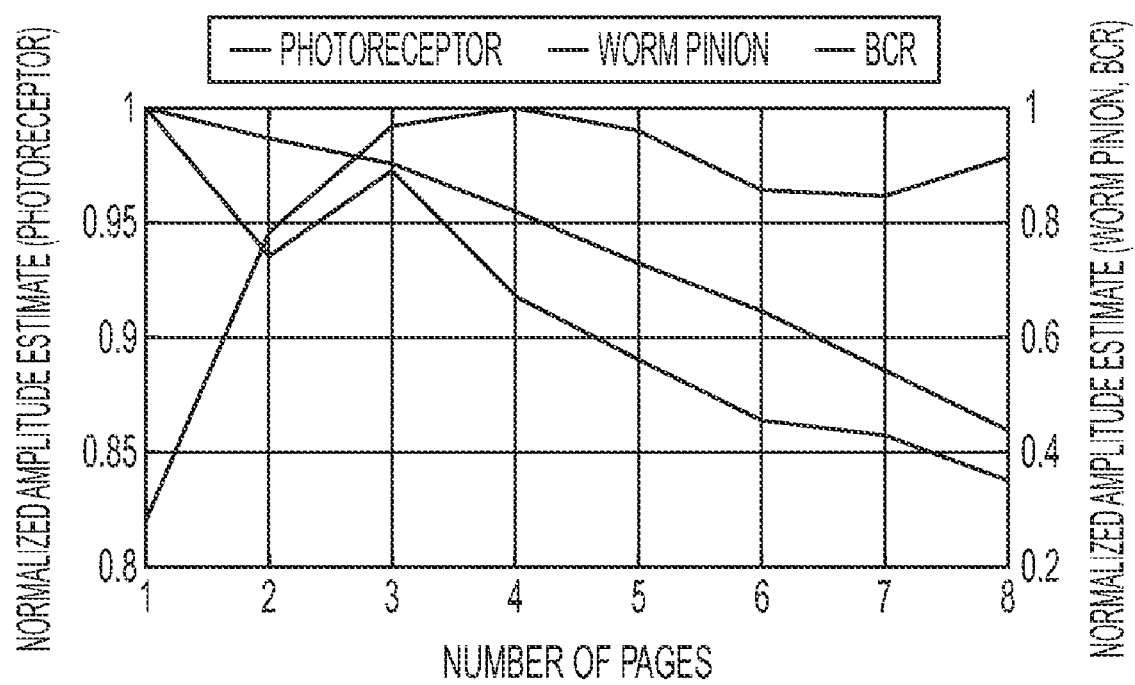
FIG. 16 shows the amplitude estimates of banding defects from scanned pages.

We then obtained profiles from actual scanned images produced by the printer. FIG. 16 shows amplitude estimates taken over a variable number of pages for the same three banding frequencies. Indeed, it can be seen that Mopt(22.76 Hz)=Mopt(3.77 Hz)=1 and Mopt(1.76 Hz)=4, verifying the simulation results.

The simulation and experimentation bear to light the significant effect of phase jitter. The system and method detailed here provide a way to effectively reconcile phase jitter to produce accurate defect profile estimates for use in banding correction. Additionally, this method and system promises a more stable system that is less susceptible to phase jitter and that allows us to quantify the effects of phase jitter to help determine acceptable tolerances for timing measurements.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

It will be appreciated that variants of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   printing by a marking device and imaging test targets over multiple sampling intervals;
   obtaining by a timer module timing information utilizing criteria including a defect, a start of an imaged page, and a page sync, wherein the obtaining includes estimating at least a time elapsed between the defect and the start of the imaged page for placing each test target relative to a banding source having a banding defect period;
   obtaining by an image sensor print profiles corresponding to an average pixel value of an image matrix by:
     determining a defect once around signal time period of a defect source inherent in the marking device, the defect source resulting in one or more banding defect frequencies;
     determining a reference scanline time delay which is a time between a page sync signal and a writing of a reference scanline;
     determining a defect time delay which is a time between a reference point on the defect source and a page sync signal; and
     determining a page sync time delay for each sampling interval which is a time between successive page sync signals for each sampling interval; and
   combining by a digital signal processing module the timing information with the print profiles to obtain an estimate of the banding defect.

2. The method as set forth in claim 1, wherein the step of combining the timing information with the print profiles includes:
   determining a sampling interval time delay for each sampling interval which is a time between a reference point on the defect source and each sampling interval;
   determining an estimation parameter from the print profile and the sampling interval time delay; and
   determining banding defect amplitude and phase estimates from an estimation parameter.

3. The method as set forth in claim 2, wherein the sampling interval time delay is determined as:

$$\tau_m \begin{cases} t_{tx-PS} + t_{PS-print} \text{ for } m = 0 \\ t_{PS-PS,m} \text{ for } m \in \{1, 2, \ldots, M-1\} \end{cases}$$

$$T_m = \sum_{i=0}^{m} \tau_i$$

where m refers to each sampling interval, M is the total number of sampling intervals, $t_{tx-PS}$ is the defect time delay, $t_{PS-print}$ is the scanline time delay, $t_{PS-PS,m}$ is the page sync time delay for sampling interval m, and $T_m$ is the sampling interval time delay for sampling interval m.

4. The method as set forth in claim 2, wherein the estimation parameter is determined as:

$$R(f) = \frac{1}{N} \sum_{m=0}^{M-1} \sum_{n=0}^{N-1} x_m(n) e^{-j2\pi f\left(\frac{n}{f_s} + T_m\right)}$$

where m refers to each sampling interval, M is the total number of sampling intervals, n refers to each sample, N is the total number of samples, $x_m(n)$ is the print profile at sample n, $f_s$, is the sampling rate, f is a banding defect frequency related to a defect once around signal time period, $T_m$ is the sampling interval time delay for sampling interval m, and R(f) is the estimation parameter for banding defect frequency f.

5. The method as set forth in claim 2, wherein the banding defect amplitude and phase are determined as:

$$A(f) = \frac{1}{M} |R(f)|$$

$$\phi(f) = \angle R(f)$$

where M is the total number of sampling intervals, R(f) is an estimation parameter for banding defect frequency f, A(f) is a banding defect amplitude estimate, and $\phi(f)$ is a banding defect phase estimate.

6. The method as set forth in claim 1, wherein the banding defect frequencies are harmonically related to a fundamental frequency.

7. The method as set forth in claim 1, wherein the banding defect estimate is determined as:

$$x_b(n) = \sum_{k=0}^{P-1} A(kf) \cos\left(2\pi \frac{n}{f_s} kf + \phi(fk)\right)$$

where P is the total number of harmonically related frequencies in the banding defect estimate, n refers to each sample in a print profile, $f_s$ is the sampling rate, f is a banding defect frequency related to a defect once around signal time period, A(kf) is a banding defect amplitude estimate, φ(kf) is a banding defect phase estimate, and $x_b(n)$ is the banding defect estimate at sample n.

8. The method as set forth in claim 1, wherein the number of multiple sampling intervals is chosen using optimization criteria.

9. The method as set forth in claim 1, wherein the multiple sampling intervals are at least one of:
   interdocument zones;
   customer image zones;
   image zones outside of the customer image zone; and
   printed pages.

10. The method as set forth in claim 1, wherein the multiple sampling intervals are located on at least on of:
    an intermediate belt;
    an intermediate drum;
    a photoreceptor belt;
    a photoreceptor drum; and
    output media.

11. The method as set forth in claim 1, wherein imaging the test targets is performed using at least one of:
    an in situ full width array sensor;
    a camera;
    an external scanner;
    a point density sensor; and
    a color measuring sensor.

12. The method as set forth in claim 1, where printing the test target is performed using at least one of:
    an electrophotographic print process;
    an aqueous ink jet printing process; and
    a solid ink jet printing process.

13. A method comprising:
    printing by a printer and imaging test targets over multiple sampling intervals;
    obtaining by a timer module limited timing information for the test targets while the test targets are being printed, the timing information being measured utilizing criteria including a defect, a start of an imaged page, and a page sync, wherein at least a time elapsed between the defect and the start of the imaged page is estimated;
    obtaining by an image sensor print profiles including an average of select values in an image matrix; and
    combining by a digital signal processing module the timing information with the print profiles to obtain an estimate of the banding defect, wherein the banding defect estimate is determined as:

$$x_b(n) = \sum_{k=0}^{P-1} A(kf)\cos\left(2\pi \frac{n}{f_s} kf + \phi(fk)\right)$$

where P is the total number of harmonically related frequencies in the banding defect estimate, n refers to each sample in a print profile, $f_s$ is the sampling rate, f is a banding defect frequency related to a defect once around signal period, A(kf) is a banding defect amplitude estimate, φ(kf) is a banding defect phase estimate, and $x_b(n)$ is the banding defect estimate at sample n.

14. A system comprising:
    a printer for printing imaging test targets over multiple sampling intervals;
    one or more defect once-around sensors for obtaining a page sync and a banding source once-around signal;
    a timing module for obtaining timing information utilizing criteria including a defect, a start of an imaged page, and the page synch, wherein the timer module obtains estimates at least a time elapsed between the defect and the start of the imaged page for placing each test target relative to a banding source having a banding defect period;
    an image sensor for obtaining print profiles corresponding to an average pixel value of an image matrix for use in determining (a) a defect once around signal time period of a defect source inherent in the marking device, the defect source resulting in one or more banding defect frequencies, (b) a reference scanline time delay which is a time between a page sync signal and a writing of a reference scanline, (c) a defect time delay which is a time between a reference point on the defect source and a page sync signal, and (d) a page sync time delay for each sampling interval which is a time between successive page sync signals for each sampling interval;
    a digital signal processing (DSP) module for combining the timing information with the print profiles to obtain an estimate of the banding defect; and
    a banding correction subsystem for correcting density variation in a printed image.

15. The system as set forth in claim 14, wherein the DSP module further comprises:
    a Fast Fourier Transform calculator;
    an optimal page number calculator; and
    a profile calculator.

16. The system set forth in claim 14, wherein the image sensor comprises an in situ full width array sensor, a camera, an external scanner, a point density sensor, or a color measuring sensor.

17. The system set forth in claim 14, wherein the printer comprises an electrophotographic printer, an aqueous ink jet printer, or a solid ink jet printer.

* * * * *